United States Patent
Sinha et al.

(10) Patent No.: US 9,507,696 B2
(45) Date of Patent: Nov. 29, 2016

(54) IDENTIFYING TEST GAPS USING CODE EXECUTION PATHS

(71) Applicant: VMWARE, INC., Palo Alto, CA (US)

(72) Inventors: Vineet Kumar Sinha, Bangalore (IN); Prasenjit Sarkar, Bangalore (IN); Prashant Kumar, Bangalore (IN); Anoop Shukla, Bangalore (IN); Sree Ranga Sudha T K, Bangalore (IN)

(73) Assignee: VMWARE, Inc., Palo Alto, CA (US)

( * ) Notice: Subject to any disclaimer, the term of this patent is extended or adjusted under 35 U.S.C. 154(b) by 216 days.

(21) Appl. No.: 14/326,481

(22) Filed: Jul. 9, 2014

(65) Prior Publication Data

US 2015/0347278 A1 Dec. 3, 2015

(30) Foreign Application Priority Data

May 28, 2014 (IN) ............................ 2630/CHE/2014

(51) Int. Cl.
*G06F 11/00* (2006.01)
*G06F 11/36* (2006.01)

(52) U.S. Cl.
CPC ....... *G06F 11/3676* (2013.01); *G06F 11/3668* (2013.01); *G06F 11/3672* (2013.01)

(58) Field of Classification Search
CPC ........... G06F 11/3668; G06F 11/3672; G06F 11/3676
See application file for complete search history.

(56) References Cited

U.S. PATENT DOCUMENTS

| | | | | |
|---|---|---|---|---|
| 8,191,044 B1 * | 5/2012 | Berlik | ................ | G06F 11/3672 717/102 |
| 2004/0025081 A1 * | 2/2004 | Gonzalez | ............ | G06F 11/3676 714/25 |
| 2004/0025088 A1 * | 2/2004 | Avvari | ................ | G06F 11/3676 714/38.13 |
| 2004/0025093 A1 * | 2/2004 | Willy | ................ | G06F 11/3676 714/54 |
| 2004/0054991 A1 * | 3/2004 | Harres | ................ | G06F 11/3664 717/131 |

\* cited by examiner

*Primary Examiner* — Joshua P Lottich
(74) *Attorney, Agent, or Firm* — Thomas | Horstemeyer, LLP

(57) ABSTRACT

Systems and techniques are described for identifying test gaps. A described technique includes identifying production code paths for an application. Each production code path specifies a respective sequence of code of the application that was executed in a production environment. Test code paths are identified for the application. Each test code path specifies a respective sequence of code of the application that was tested in a test environment. The production code paths are compared to the test code paths to identify a set of first test gaps for the application. Each first test gap specifies a respective production code path that is not included in the test code paths. Test gap data specifying the first test gaps for the application can be provided for presentation to a user.

16 Claims, 4 Drawing Sheets

IDENTIFYING TEST GAPS USING CODE EXECUTION PATHS

RELATED APPLICATIONS

Benefit is claimed under 35 U.S.C. 119(a)-(d) to Foreign application Ser. No. 2630/CHE/2014 filed in India entitled "IDENTIFYING TEST GAPS USING CODE EXECUTION PATHS", filed on May 28, 2014, by VMware, Inc., which is herein incorporated in its entirety by reference for all purposes.

BACKGROUND

This document relates to identifying code execution paths of an application that may not be covered in a test environment.

Software applications can be tested by executing portions of the application code in a test environment. For example, a test may simulate the functionality of one or more particular modules included in the application to ensure that the modules work as intended. Tests can be generated to automatically test modules and code that are of interest to the application developer. However, it can be difficult and/or time consuming to develop a test that tests every line of code of a large application.

Application developers may use a code coverage tool to determine the degree to which the application code is tested. Such code coverage tools typically determine the percent of code statements or lines of code that were called and executed during the test.

SUMMARY

In general, one aspect of the subject matter described in this document can be embodied in a technique that includes identifying production code paths for an application, each production code path specifying a respective sequence of code of the application that was executed in a production environment; identifying test code paths for the application, each test code path specifying a respective sequence of code of the application that was tested in a test environment; comparing the production code paths to the test code paths to identify a set of first test gaps for the application, each first test gap specifying a respective production code path that is not included in the test code paths; and providing test gap data specifying the first test gaps for the application for presentation to a user.

These and other aspects can optionally include one or more of the following features. In some implementations, identifying the production code paths for the application includes analyzing at least one of: a production log for the application, a code dump for the application, or a thread dump for the application. Identifying the test code paths for the application can include monitoring execution of a test operation on the application.

Aspects can include generating a first tree data structure that specifies the production code paths and generating a second tree data structure that specifies the test code paths. Comparing the production code paths to the test code paths can include comparing the first tree data structure to the second tree data structure.

Aspects can include analyzing source code of the application to identify each potential code execution path of the application. Each potential code execution path specifies a respective potential sequence of the application code that can be executed during execution of the application. Aspects can include comparing the potential code execution paths to the test code paths to identify a set of second test gaps for the application. Each second test gap specifies a respective potential code execution path that is not included in the test code paths.

Aspects can include generating a first tree data structure that specifies the potential code execution paths and generating a second tree data structure that specifies the test code paths. Comparing the potential code execution paths to the test code paths can include comparing the first tree data structure to the second tree data structure.

Particular embodiments of the subject matter described in this document can be implemented so as to realize one or more of the following advantages. Software applications can be more thoroughly tested by identifying differences between paths of code executed in a production environment and paths of code executed using a test, and modifying the test to account for the differences. The thoroughness of the test can also be improved by identifying differences between the paths of code of the application that could potentially be executed and the paths of code executed using a test and modifying the test to account for the differences. By ensuring that particular combinations of groups of code are tested, e.g., combinations of modules or functions, errors during the execution of the application in a production environment can be reduced.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
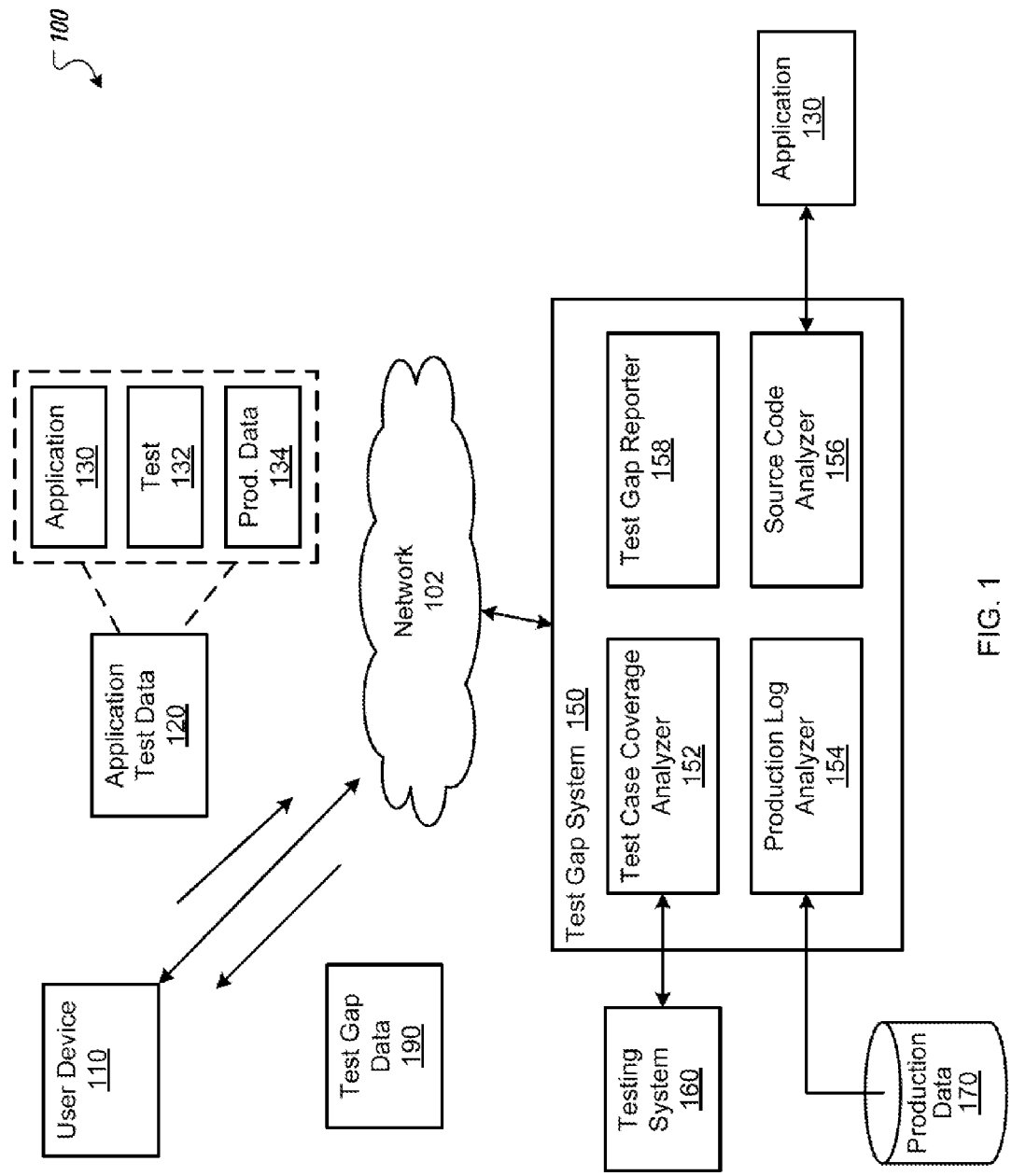
FIG. 1 shows an example environment in which a test gap system identifies test gaps for applications.

This document generally describes techniques for identifying test gaps for applications. Errors in modules and other particular groups of application code can be identified by testing the groups of application code independently. However, additional errors or fault conditions may result from the execution of particular sequences of groups of application code. For example, independent tests of module A may not uncover any errors in module A. However, when module B calls module A, the execution of module A may result in an error condition. Such error conditions may not be uncovered and corrected if a sequence of code that includes module B calling module A is not tested. As used herein, a group of application code can include one or more lines of code, one or more modules, one or more functions, one or more methods, or another appropriate group of code for an application.

In addition, testing groups of application code in the order in which they are arranged in an application's code may not result in the testing of each potential sequence as a module that is positioned after another module in the application code may call the other module. For example, if module A is positioned after module B in application code, but module A calls module B, testing the code in the order in which it is arranged may not result in a test of a sequence that includes module A calling module B.

A test gap can identify one or more code paths—e.g., one or more sequences of application code—of the application that are not being tested using a particular test for the application. For example, a test gap may specify a sequence of modules, functions, lines of application code, and/or other appropriate groups of application code, that are not being executed in that sequence using the particular test. While the identified code paths are not executed using a particular test, the code paths are capable of being executed in their respective sequences.

Test gaps may be identified with respect to production code paths and/or with respect to potential code execution paths. For example, actual test gaps may specify sequences of groups of application code that are being executed during actual use of the application, but are not being tested in that sequence using the particular test. Data specifying the actual test gaps can be provided to an application developer that develops the application. In this way, application developers can be informed of sequences of application code that are being executed in actual use and may be able to modify their tests to cover such sequences.

Similarly, potential test gaps may specify sequences of groups of application code that can potentially be executed in that sequence, but are not being tested in that sequence using the particular test. This may allow application developers to modify their tests to cover as many sequences as practical for their applications, or to cover particular sequences of interest to the application developer that are not being tested using the current test.

FIG. 1 shows an example environment 100 in which a test gap system 150 identifies test gaps for applications. The example environment 100 includes a network 102, a local area network (LAN), wide area network (WAN), e.g., the Internet, or a combination thereof. The network 102 connects user devices, e.g., the user device 110, with the test gap system 150.

The user device 110 is an electronic device, e.g., a computer, that can send application test data 120 to the test gap system 150. The application test data 120 can include an application 130 that is to be tested, a test 132 for the application 130, and/or production data 134 for the application. The test 132 may include steps, routines, modules, data, and so on, for use in performing the test 132. For example, the test 132 may include several steps for receiving and processing data with the application 130 that is being tested.

The production data 134 for the application 130 may include data collected during actual use of the application 130, for example, in a production environment. For example, the production data 134 may include one or more productions logs, one or more code dumps, and/or one or more thread dumps for the application 130. A production log for an application 130 may include data collected during the execution of the application 130. For example, the production log may specify groups of application code that were executed. The production log may also include the result of the execution of each group of code, any faults that occurred as a result of the execution, and/or the time and date at which each group of application code was executed.

In some implementations, the production logs may also include, for each executed group of code, a token that identifies a thread or sequence of code in which the executed group of code was executed. The production logs may also include, for each executed group of code, data identifying a calling group of code that called the executed group of code and a called group of code that was called by the executed group of code. For example, the production log may indicate that function A was called by function F and executed in thread G in response to being called by function B.

A logging application may be configured to log such data during the execution of the application. In a particular example, the logging application may generate a statement for each group of code that is executed. Such a statement may identify the executed group of code, the date and time the group of code was executed, a thread in which the group of code was executed, a group of code that called the executed group of code, and a group of code called by the executed group of code. Particular sequences of executed code can be identified from the production logs based on the data included in the statements.

A thread dump for an application 130 can include data related to threads that were executed for the application 130. For example, a thread dump may be a snapshot of threads running at a given time. The data of a thread dump may include a thread identifier, groups of code executed by the thread and a date and time at which each group of code was executed, memory data, e.g., memory stored in registers at the time of dump, and/or other appropriate data regarding each thread. A code dump can include similar data for the application 130 and can be collected, for example, in response to the application 130 terminating abnormally The production log(s), the thread dump(s), and/or the code dump(s) can include log(s) or dump(s) related to the execution of the application 130 for one or more users. For example, the production data may include a production log for each of one or more users or a combined production log for a group of users. The test gap system 150 can receive the production data 134 from the user device 110 and store the production data 134 for the application 130 in a production data store 170.

The test gap system 150 is an example of a system implemented as one or more computer programs executing on one or more computers in one or more physical locations and can identify test gaps for the application 130 and the test included in the application test data 120. The example test gap system 150 includes a test case coverage analyzer 152, a production log analyzer 154, a source code analyzer 156, and a test gap reporter 158, each of which may be implemented using hardware and/or software. Although this diagram depicts the test case coverage analyzer 152, the production log analyzer 154, the source code analyzer 156, and the test gap reporter 158 as logically separate, such depiction is merely for illustrative purposes. The objects/processes portrayed in this figure can be arbitrarily combined or divided into separate components. Furthermore, such objects/processes, regardless of how they are combined or divided, can execute on the same computer or can be distributed among different computers connected by one or more networks.

The test case coverage analyzer 152 can identify test code paths fir an application and for a particular test, e.g., the application 130 and test 132 received in application test data 120. Each test code path can specify a sequence of code of the application 130 that is tested using the test 132. For example, the test 132 may include instructions that cause module A, module B, and module C of the application 130 to be executed in that order during the test 132. The test case coverage analyzer 158 can detect that the modules were executed in that order during the execution of the test 132. For example, one of the test code paths may specify a sequence of module A→module B→module C.

In some implementations, the test case coverage analyzer 152 identifies the test code paths by monitoring execution of a test operation on the application 130. For example, a testing system 160 may execute the test 132 for the application 130. During the execution of the test 132, the test case coverage analyzer 152 may monitor the execution of code of the application 130 and log data specifying the sequence of code executed during the test 132. The test case coverage analyzer 152 may generate the test code paths based on the logged data.

The production log analyzer 154 can identify production code paths for the application 130, for example, using production data for the application 130 stored in the production data store 170. A production code path can specify a sequence of code of the application that was executed in a production environment. For example, a production code path may specify a particular sequence of modules, functions, or lines of code that was executed during a live run of the application 130.

The production log analyzer 154 may analyze the production log(s), thread dump(s), and/or code dump(s) for the application 130 to identify the production code paths for the application. The production log analyzer 154 may analyze the logs and dumps to identify the sequence in which groups of code were executed and designate the identified sequences as production code paths. For example, a production log may specify, for each executed group of code, a thread in which the group of code was executed and a time and date at which the group of code was executed, a group of code that called the executed group of code, and a group of code called by the executed group of code. The production log analyzer 154 may use the time and date of code groups executed for a particular thread and/or the data specifying which groups of code called which other groups of code to determine the sequence in which the code groups were executed. The production log analyzer 154 may designate each determined sequence as a production code path for the application 130. For example, the production log analyzer 154 may determine that a particular thread called function A, then function D, and then function B. In this example, the production log analyzer 154 may identify a production code path of function A→function D→function B.

The source code analyzer 156 can identify potential code execution paths for the application 130. A potential code execution path can specify a potential sequence of the code of the application 130 that can be executed during execution of the application 130. The source code analyzer 156 can analyze source code of the application 130 to identify each potential code execution path of the application 130. For example, the source code analyzer 156 may parse the application code and analyze the parsed code to determine each possible code execution path included in the application 130.

A group of application code may be included in multiple potential code execution paths. For example, a particular module may be called by multiple other modules and the particular module may call multiple other modules. The source code analyzer 156 may identify a potential code execution path for each possible combination of paths to and from the particular module. For example, module A may be called by either module B or module C. In addition, module A may call module D or module E, for example, based on an input to module A. In this example, the source code analyzer 156 may analyze modules B and C and determine that the modules call module A. In addition, the source code analyzer 156 may analyze module A and determine that module A can call either module IL) or module E. In response to the determinations, the source code analyzer 156 may identify the following potential execution paths: module B→module A→module D; module B→module A→module E; module C→module A→module D; and module C→module A→module E. The execution paths above are examples only, the modules may call other modules leading to additional potential code execution paths.

The test gap reporter 158 can identify actual and potential test gaps for the application 130 and for the test 132. The test gap analyzer 158 may identify test gaps with respect to the production code paths and/or with respect to the potential code execution paths. For example, the test gap analyzer 158 may compare a set of test code paths identified by the test case coverage analyzer 152 to a set of production code paths identified by the production log analyzer 154 to identify actual test gaps, e.g., differences, between the two sets of code paths. An actual test gap specifies a production code path that is not included in the set of test code paths, i.e., a code path that is identified as being executed in production but that is not being tested using the test 132 for the application 130.

The test gap reporter 158 may compare a set of test code paths for the application 130 identified by the test case coverage analyzer 152 to a set of potential code execution paths for the application 130 identified by the source code analyzer 156 to identify potential test gaps between the two sets of code paths. A potential test gap specifies a potential code execution path that is not included in the set of test code paths i.e., a potential code execution path of the application 130 that is identified as not being tested using the test 132 for the application 130.

The test gap reporter 158 can report the actual test gaps and/or the potential test gaps to a user, e.g., an application developer that develops the application for which the test gaps were identified. For example, the test gap reporter 158 may generate and send test gap data 190 to a user device 110 of the user. The test gap data 190 may specify each of the actual test gaps and/or each of the potential test gaps identified by the test gap reporter 158. The test gap data 190 may also specify the percentage of code paths tested. For example, the test gap reporter 158 may determine the percentage of production code paths that are included in the test code paths and/or the percentage of potential code execution paths that are included in the test code paths.

In some implementations, the test gap reporter 158 identifies test gaps by comparing tree data structures for the code paths. A tree data structure may identify code paths in a tree graph form. For example, the tree data structure may include nodes for each group of code and a directed edge between two groups of code that were—or that could potentially be—executed in sequence, e.g., one after the other.

Figure 2:
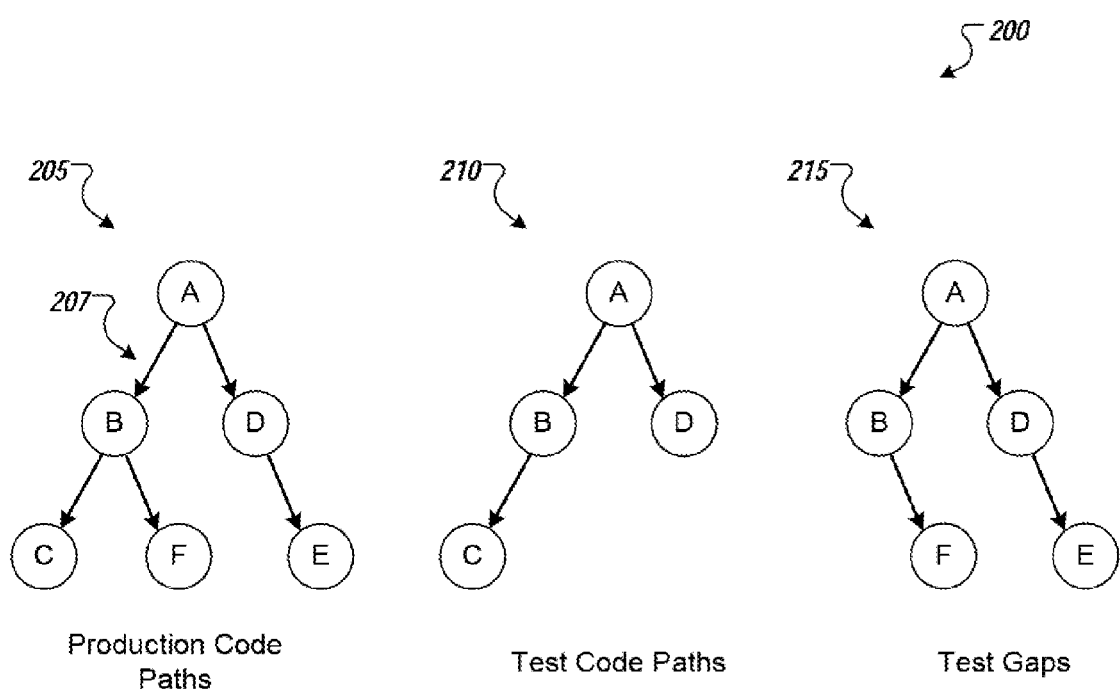
FIG. 2 shows tree data structures used to identify test gaps for an application.

FIG. 2 shows tree data structures 205, 210, and 215 used to identify test gaps for an application. The example tree data structure 205 specifies production code paths for an application that includes six modules A, B, C, D, E, and F. In this example, the application includes three production code paths: A→B→C; A→B→F; and A→D→E. The tree data structure 205 includes a node for each module and a directed edge between two sequentially executed modules. For example, a directed edge 207 connects the node for module A with the node for module B as module A was executed immediately before module B in a particular execution path while the application was being executed in a production environment. The example tree data structure 210 specifies test code paths for the application and a test for the application. In this example, the application includes two test code paths: A→B→C; and A→D.

The tree data structure 210 can be compared to the tree data structure 205 to identify test gaps between the application and the test for the application. Based on the comparison, a test gap tree data structure 215 is generated. The test gap tree data structure 215 specifies the production code paths of the tree data structure 205 that are not included in the test code paths of the tree data structure 210. In particular, the tree data structure 215 specifies the production code paths: A→B→F; and A→D→E.

Figure 3:
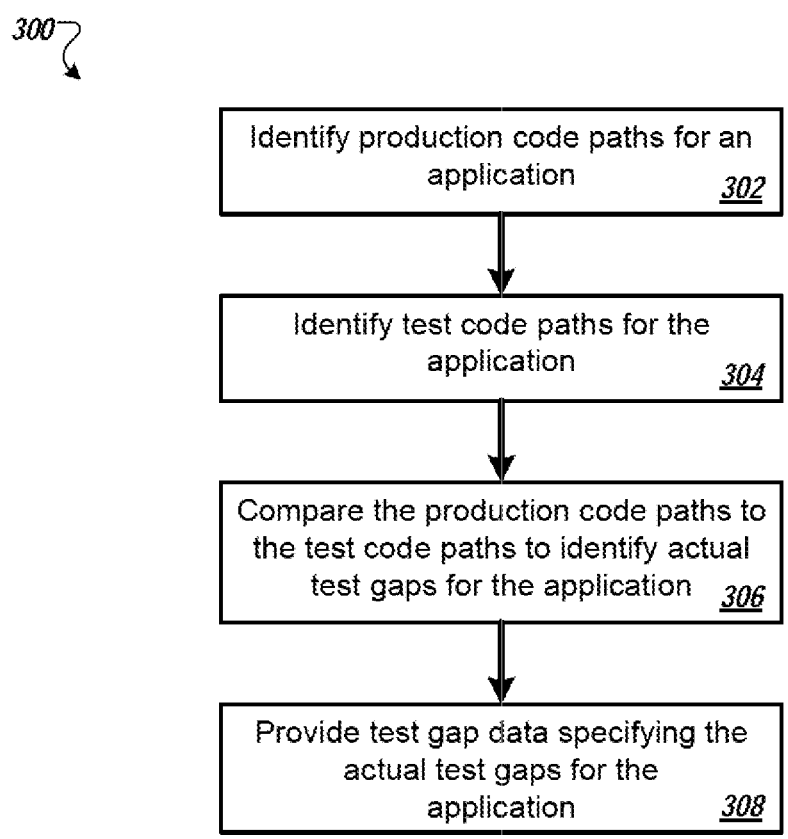
FIG. 3 is a flow chart of an example technique for identifying test gaps for an application and providing test gap data that specifies the identified test gaps.

FIG. 3 is a flow chart of an example technique 300 for identifying test gaps for an application and providing test gap data that specifies the identified test gaps. The example technique 300 is performed by a system of one or more computers. For example, the technique 300 may be performed by the test gap system 150 of FIG. 1.

At block 302, the system identifies production code paths for an application. In some implementations, production log(s), thread dump(s), and/or code dump(s) for the application are analyzed to identify the production code paths for the application. For example, the system may analyze the logs and/or dumps to identify the sequence in which groups of application code were executed. The system may generate data that specifies the production code paths based on the identified sequences. For example, a production log may specify, for each executed group of code, a thread in which the group of code was executed, a time and date at which the group of code was executed, and/or groups of code that called or was called by the executed group of code. The system may use the time and date of code groups executed for a particular thread and/or the data identifying the groups of code that were called by or that called other groups to determine the sequence in which the code groups were executed. In turn, the system may designate each identified sequence as a production code path for the particular thread.

In some implementations, the system generates a tree data structure for the production code paths. The tree data structure for the production code paths can specify the production code paths using nodes and directed edges. For example, the tree data structure may include a node for each group of application code executed in a production environment and a directed edge between groups of application code that were executed sequentially in a particular execution path of the application. In a particular example, a directed edge may connect a node for module A to a node for module B if module A called module B during the execution of the application in a production environment.

At block 304, the system identifies test code paths for the application. The system may identify test code paths for the application with respect to a particular test for the application. For example, the application may be associated with multiple tests and test gaps may be identified for each of the tests. In some implementations, the test code paths for an application and a test are identified by monitoring execution of a test operation on the application. For example, the system may monitor the execution of code of the application during the test and log data based on the monitoring. The logged data may specify the sequence of code executed during the test. The system may identify each sequence of code executed during the test as a test code path.

The system may also generate a tree data structure for the test code paths. The tree data structure for the test code paths can specify the test code paths using nodes and directed edges. For example, the tree data structure may include a node for each group of application code executed during the test and a directed edge between groups of application code that were executed sequentially in a particular tested path of the application.

At block 306, the system compares production code paths to the test code paths to identify actual test gaps for the application and the test. For example, the system may compare the code paths to identify any production code paths that are not included in the test code paths. The system may designate such production code paths as actual test gaps. In some implementations, the system compares the tree data structure for the production code paths to the tree data structure of the test code paths to identify the actual test gaps for the application and the test.

In implementations in which the application is associated with two or more tests, the system may aggregate the test code paths to form an aggregated set of test code paths. For example, the tests may cover different code paths. The system may compare the test code paths of the aggregated set of test code paths to the production code paths to identify the actual test gaps for the application and its associated set of tests. For example, the system may designate any production code path that is not included in the aggregated set of test code paths as an actual test gap, where the aggregated set of test code paths includes each test code path that appears in the test code paths for at least one of the tests.

At block 308, the system generates and provides test gap data that specifies the actual test gaps for the application. For example, the system may provide data specifying the actual test gaps to a user device for display to an application developer that develops the application. In turn, the application developer may be able to modify the test(s) to cover one or more of the actual test gaps.

Figure 4:
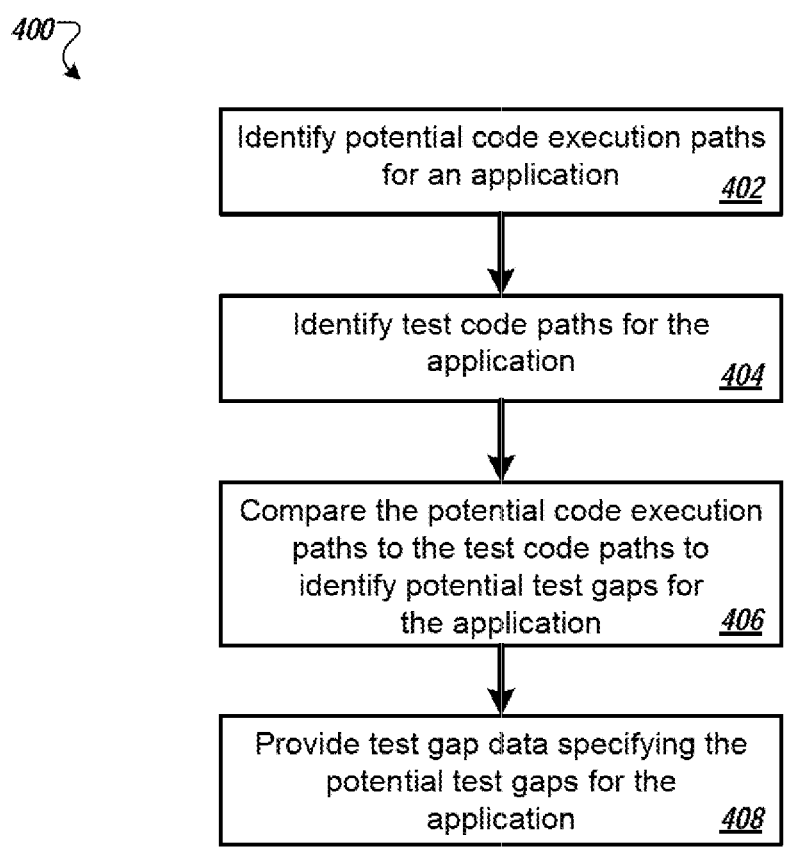
FIG. 4 is a flow chart of another example technique for identifying test gaps for an application and providing test gap data that specifies the identified test gaps.

FIG. 4 is a flow chart of another example technique 400 for identifying test gaps for an application and providing test gap data that specifies the identified test gaps. The example technique 400 is performed by a system of one or more computers. For example, the technique 300 may be performed by the test gap system 150 of FIG. 1.

At block 402, the system identifies potential code execution paths for an application. In some implementations, the system analyzes the source code of the application to identify each potential code execution path of the application. For example, the system may parse the application code and analyze the parsed code to identify each possible code execution path included in the application.

In some implementations, the system generates a tree data structure for the potential code execution paths. The tree data structure for the potential code execution paths can specify the potential code execution paths using nodes and directed edges. For example, the tree data structure may include a node for each group of application code that could potentially executed in a production environment and a directed edge between groups of application code that could potentially be executed sequentially in a particular execution path of the application. For example, a directed edge may connect a node for module A to a node for module B if module A could potentially call module B during the execution of the application.

At block 404, the system identifies test code paths for the application. The system may identify the test code paths for the application with respect to a particular test for the application. For example, the application may be associated with multiple tests and test gaps may be identified for each of the tests. In some implementations, the system identifies test code paths for an application and a test by monitoring execution of a test operation on the application. For example, the system may monitor the execution of code of the application during the test and log data based on the monitoring. The logged data may specify the sequence of code executed during the test. The system may identify each sequence of code executed during the test as a test code path.

The system may also generate a tree data structure for the test code paths. The tree data structure for the test code paths can specify the test code paths using nodes and directed edges. For example, the tree data structure may include a node for each group of application code executed in during the test and a directed edge between groups of application code that were executed sequentially in a particular tested path of the application.

At block 404, the system compares the potential code execution paths to the test code paths to identify potential test gaps for the application and the test. For example, the system may compare the code paths to identify any potential code execution paths that are not included in the test code paths. The system may designate such potential code execution paths as potential test gaps. In some implementations, system compares the tree data structure for the potential code execution paths to the tree data structure to identify the potential test gaps for the application and the test.

In implementations in which the application is associated with two or more tests, the system may aggregate the test code paths to form an aggregated set of test code paths. For example, the tests may cover different code paths. The system may compare the test code paths of the aggregated set of test code paths to the potential code execution paths to identify the potential test gaps for the application and its associated set of tests. For example, the system may designate any potential code execution path that is not included in the aggregated set of test code paths as a potential test gap, where the aggregated set of test code paths includes each test code path that appears in the test code paths for at least one of the tests.

At block 408, the system generates and provides test gap data that specifies the potential test gaps for the application. For example, data specifying the potential test gaps may be provided for display to an application developer that develops the application. In turn, the application developer may be able to modify the test(s) to cover one or more of the potential test gaps.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
identifying production code paths for an application, each production code path specifying a respective sequence of code of the application that was executed in a production environment;
identifying test code paths for the application, each test code path specifying a respective sequence of code of the application that was tested in a test environment;
comparing the production code paths to the test code paths to identify a set of first test gaps for the application, each first test gap specifying a respective production code path that is not included in the test code paths;
analyzing source code of the application to identity each potential code execution path of the application, each potential code execution path specifying a respective potential sequence of the application code that can be executed during execution of the application;
comparing the potential code execution paths to the test code paths to identify a set of second test gaps for the application, each second test gap specifying a respective potential code execution path that is not included in the test code paths; and
providing test gap data specifying the first test gaps and the second test gaps for the application for presentation to a user.

2. The method of claim 1, wherein identifying the production code paths for the application comprises analyzing at least one of: a production log for the application, a code dump for the application, or a thread dump for the application.

3. The method of claim 1, wherein identifying the test code paths for the application comprises monitoring execution of a test operation on the application.

4. The method of claim 1, further comprising:
generating a first tree data structure that specifies the production code paths; and generating a second tree data structure that specifies the test code paths,
wherein comparing the production code paths to the test code paths comprises comparing the first tree data structure to the second tree data structure.

5. The method of claim 1, further comprising:
generating a first tree data structure that specifies the potential code execution paths; and
generating a second tree data structure that specifies the test code paths
wherein comparing the potential code execution paths to the test code paths comprises comparing the first tree data structure to the second tree data structure.

6. A system comprising:
a data processing apparatus; and
a memory apparatus in data communication with the data processing apparatus and storing instructions executable by the data processing apparatus and that upon such execution cause the data processing apparatus to perform operations comprising:
identifying production code paths for an application, each production code path specifying a sequence of code of the application that was executed in a production environment;
identifying test code paths for the application, each test code path specifying a sequence of code of the application that was tested in a test environment;
identifying a set of first test gaps for the application, each first test gap specifying a production code path that is not included in the test code paths;
analyzing source code of the application to identity each potential code execution path of the application, each potential code execution path specifying a respective potential sequence of the application code that can be executed during execution of the application;
comparing the potential code execution paths to the test code paths to identify a set of second test gaps for the application, each second test gap specifying a respective potential code execution path that is not included in the test code paths; and
providing test gap data specifying the first test gaps and the second test gaps for the application.

7. The system of claim 6, wherein identifying the production code paths for the application comprises analyzing at least one of: a production log for the application, a code dump for the application, or thread dump for the application.

8. The system of claim 6, wherein identifying the test code paths for the application comprises monitoring execution of a test operation on the application.

9. The system of claim 6, wherein the operations further comprise:
generating a first tree data structure that specifies the production code paths; and
generating a second tree data structure that specifies the test code paths, wherein
identifying the set of first test gaps for the application comprises comparing the first tree data structure to the second tree data structure.

10. The system of claim 6, wherein the operations further comprise:
generating a first tree data structure that specifies the potential code execution paths, and generating a second tree data structure that specifies the test code paths,
wherein comparing the potential code execution paths to the test code paths comprises comparing the first tree data structure to the second tree data structure.

11. A computer storage medium encoded with a computer program, the computer program comprising instructions that when executed by a data processing apparatus cause the data processing apparatus to perform operations comprising:
identifying production code paths for an application, each production code path specifying a sequence of code of the application that was executed in a production environment;
identifying test code paths for the application, each test code path specifying a sequence of code of the application that was tested in a test environment
comparing the production code paths to the test code paths to identify a set of first test gaps for the application, each first test gap specifying a production code path that is not included in the test code paths:
identifying each potential code execution path of the application, each potential code execution path specifying a potential sequence of the application code that can be executed while the application is being executed;
comparing the potential code execution paths to the test code paths to identify a set of second test gaps for the application, each second test gap specifying a potential code execution path that is not included in the test code paths; and
providing test gap data specifying the first test gaps and the second test gaps for the application.

12. The computer storage medium of claim 11, wherein identifying the production code paths for the application comprises analyzing at least one of: a production log for the application, a code dump for the application, or a thread dump for the application.

13. The computer storage medium of claim 11, wherein identifying the test code paths for the application comprises monitoring execution of a test operation on the application.

14. The computer storage medium of claim 11, wherein the operations further comprise:
generating a first tree data structure that specifies the production code paths; and
generating a second tree data structure that specifies the test code paths,
wherein comparing the production code paths to the test code paths comprises comparing the first tree data structure to the second tree data structure.

15. The computer storage medium of claim 11, wherein identifying each potential code execution path comprises analyzing source code of the application to identify each potential code execution path of the application.

16. The computer storage medium of claim 11, wherein the operations further comprise:
generating a first tree data structure that specifies the potential code execution paths; and
generating a second tree data structure that specifies the test code paths,
wherein comparing the potential code execution paths to the test code paths comprises comparing the first tree data structure to the second tree data structure.

* * * * *